US012641308B2

(12) United States Patent
Gao et al.

(10) Patent No.: US 12,641,308 B2
(45) Date of Patent: May 26, 2026

(54) METHOD, APPARATUS, ELECTRONIC DEVICE AND STORAGE MEDIUM FOR DISPLAYING VIDEO

(71) Applicant: Beijing Zitiao Network Technology Co., Ltd., Beijing (CN)

(72) Inventors: Lin Gao, Beijing (CN); Bingqing Liu, Beijing (CN); Wei Fang, Beijing (CN); Jiawei He, Beijing (CN); Jiaying Feng, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 168 days.

(21) Appl. No.: 18/569,596

(22) PCT Filed: Aug. 9, 2022

(86) PCT No.: PCT/CN2022/111012
§ 371 (c)(1),
(2) Date: Dec. 12, 2023

(87) PCT Pub. No.: WO2023/020325
PCT Pub. Date: Feb. 23, 2023

(65) Prior Publication Data
US 2024/0283998 A1      Aug. 22, 2024

(30) Foreign Application Priority Data
Aug. 20, 2021      (CN) .......................... 202110963513.2

(51) Int. Cl.
*G06F 3/00*          (2006.01)
*H04N 21/431*      (2011.01)
(Continued)

(52) U.S. Cl.
CPC ... *H04N 21/4312* (2013.01); *H04N 21/47217* (2013.01)

(58) Field of Classification Search
None
See application file for complete search history.

(56) References Cited

U.S. PATENT DOCUMENTS 8,537,127 B2 *    9/2013    Homma ................ G06F 3/0488
                                                               345/173
10,219,026 B2 *    2/2019    Eim .................... G06F 3/04817
(Continued)

FOREIGN PATENT DOCUMENTS

CN          103997691 A          8/2014
CN          107666623 A          2/2018
(Continued)

OTHER PUBLICATIONS

International Patent Application No. PCT/CN2022/111012; Int'l Search Report; dated Nov. 16, 2022; 3 pages.

*Primary Examiner* — Toan H Vu
(74) *Attorney, Agent, or Firm* — BakerHostetler

(57) ABSTRACT
The embodiments of the disclosure provide a method, apparatus, electronic device, and storage medium for displaying a video. The method includes: receiving a trigger operation for viewing a video detection interface; in response to the trigger operation, displaying the video detection interface, wherein a video playback area and a playback progress bar of the video are displayed in the video detection interface, at least one progress identification is presented on the playback progress bar, and the progress identification is used for indicating video detection information corresponding to a playback progress.

20 Claims, 5 Drawing Sheets

(51) Int. Cl.
    *H04N 21/472* (2011.01)
    *G06F 3/01* (2006.01)

(56) References Cited

U.S. PATENT DOCUMENTS

| | | | | |
|---|---|---|---|---|
| 2007/0204238 A1* | 8/2007 | Hua | ..................... | G06F 16/745 |
| | | | | 715/838 |
| 2008/0055272 A1* | 3/2008 | Anzures | ................ | G06F 1/1686 |
| | | | | 345/173 |
| 2010/0086283 A1 | 4/2010 | Ramachandran et al. | | |
| 2013/0046641 A1* | 2/2013 | DeVree | ............. | G06Q 30/0277 |
| | | | | 705/14.69 |
| 2014/0215337 A1* | 7/2014 | Park | ...................... | G11B 27/34 |
| | | | | 715/720 |
| 2015/0117834 A1* | 4/2015 | Cai | ....................... | G11B 27/36 |
| | | | | 386/230 |
| 2017/0064374 A1* | 3/2017 | Eim | ..................... | G06F 3/0485 |
| 2018/0081510 A1* | 3/2018 | Ekstrand | .......... | H04N 21/44204 |
| 2019/0265875 A1* | 8/2019 | Park | ..................... | G11B 27/005 |
| 2020/0007944 A1 | 1/2020 | Han et al. | | |
| 2021/0084376 A1* | 3/2021 | Tang | ....................... | A63F 13/67 |
| 2021/0289266 A1* | 9/2021 | Zhang | ............. | H04N 21/47217 |
| 2022/0188069 A1* | 6/2022 | Zhang | ............... | H04N 21/4221 |
| 2023/0017489 A1* | 1/2023 | Gupta | ............... | H04N 21/8549 |

FOREIGN PATENT DOCUMENTS

| | | |
|---|---|---|
| CN | 107995515 A | 5/2018 |
| CN | 110366043 A | 10/2019 |
| CN | 111629222 A | 9/2020 |
| CN | 112423087 A | 2/2021 |
| CN | 112953814 A | 6/2021 |
| CN | 113179418 A | 7/2021 |
| CN | 113286197 A | 8/2021 |
| CN | 113784195 A | 12/2021 |

* cited by examiner

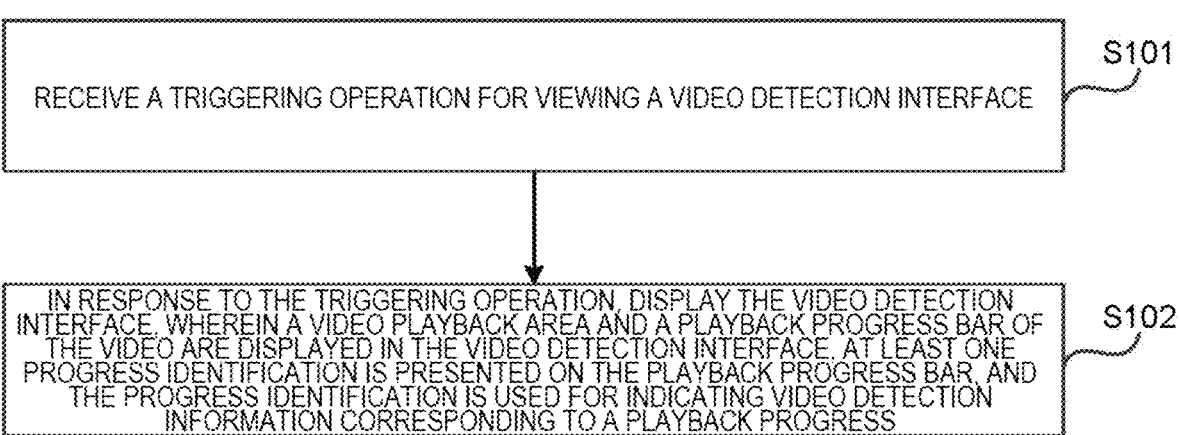

RECEIVE A TRIGGERING OPERATION FOR VIEWING A VIDEO DETECTION INTERFACE — S101

IN RESPONSE TO THE TRIGGERING OPERATION, DISPLAY THE VIDEO DETECTION INTERFACE, WHEREIN A VIDEO PLAYBACK AREA AND A PLAYBACK PROGRESS BAR OF THE VIDEO ARE DISPLAYED IN THE VIDEO DETECTION INTERFACE, AT LEAST ONE PROGRESS IDENTIFICATION IS PRESENTED ON THE PLAYBACK PROGRESS BAR, AND THE PROGRESS IDENTIFICATION IS USED FOR INDICATING VIDEO DETECTION INFORMATION CORRESPONDING TO A PLAYBACK PROGRESS — S102

FIG. 1

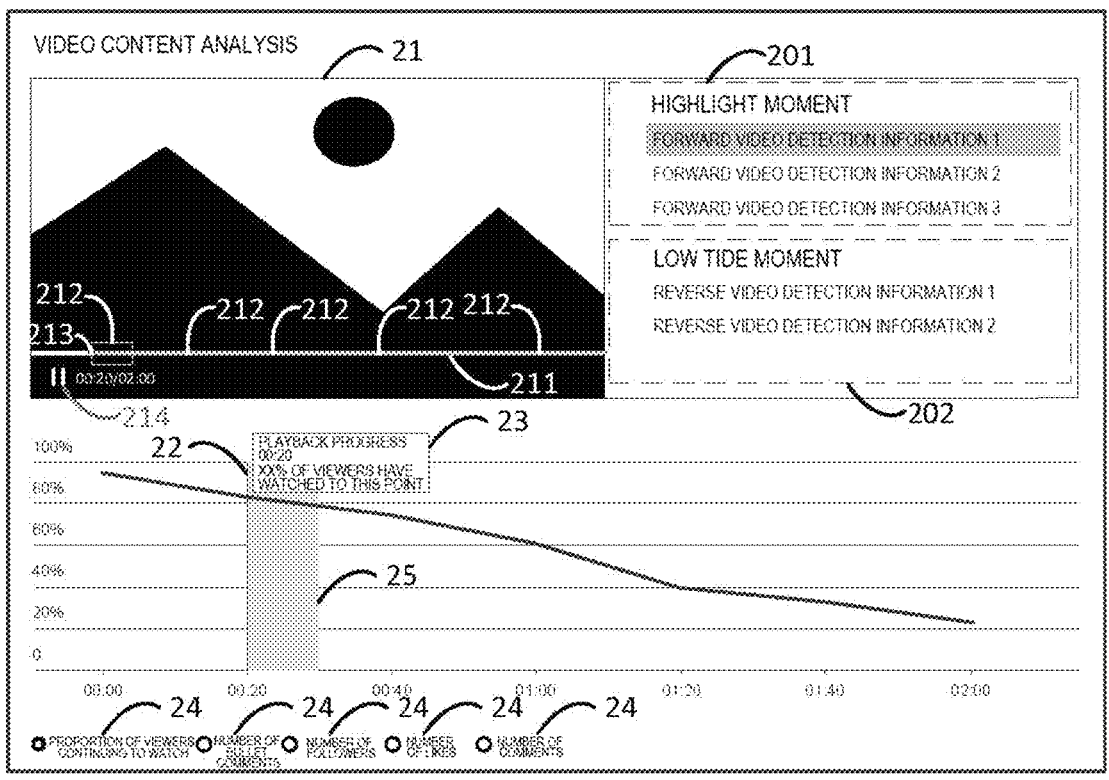

FIG. 2

RECEIVE A TRIGGER OPERATION FOR VIEWING A VIDEO DETECTION INTERFACE ⟶ S201

IN RESPONSE TO THE TRIGGERING OPERATION, DISPLAY THE VIDEO DETECTION INTERFACE, WHERE A VIDEO PLAYBACK AREA, A PLAYBACK PROGRESS BAR OF A VIDEO, VIDEO DETECTION INFORMATION INDICATED BY AT LEAST ONE PROGRESS IDENTIFICATION PRESENTED ON THE PROGRESS BAR, AND A TREND GRAPH OF THE VIDEO ARE DISPLAYED IN THE VIDEO DETECTION INTERFACE ⟶ S202

IN RESPONSE TO A PRESENTING OPERATION FOR A TARGET VIDEO SEGMENT CORRESPONDING TO TARGET VIDEO DETECTION INFORMATION, PRESENT THE TARGET VIDEO SEGMENT IN THE VIDEO PLAYBACK AREA, DISPLAY THE TARGET PROGRESS IDENTIFICATION FOR INDICATING THE TARGET VIDEO DETECTION INFORMATION AS BEING IN A FIRST DISPLAY STATE, DISPLAY OTHER PROGRESS IDENTIFICATIONS OTHER THAN THE TARGET PROGRESS IDENTIFICATION AS BEING IN A SECOND DISPLAY STATE, DISPLAY THE TARGET VIDEO DETECTION INFORMATION AS BEING IN A SELECTED STATE, ADJUST THE TARGET ICON IN THE TREND GRAPH TO A POSITION MATCHING A TIME POINT CORRESPONDING TO THE PRESENTING OPERATION, AND DISPLAY A TIME SEGMENT OF THE TARGET VIDEO SEGMENT IN THE TREND GRAPH IN A PRESET DISPLAY STATE ⟶ S203

IN RESPONSE TO THE TRIGGERING OPERATION FOR PLAYING THE VIDEO, PLAY THE VIDEO, AND ADJUST THE POSITION OF THE PROGRESS POINT IN THE PLAYBACK PROGRESS BAR AND THE POSITION OF THE TARGET ICON IN THE TREND GRAPH ACCORDING TO THE PLAYBACK PROGRESS OF THE VIDEO ⟶ S204

IN THE CASE THAT THE VIDEO IS PLAYED TO A VIDEO SEGMENT CORRESPONDING TO ANY VIDEO DETECTION INFORMATION, PERFORM AT LEAST ONE OF THE FOLLOWING STEPS: DISPLAYING THE PROGRESS IDENTIFICATION INDICATING THE VIDEO DETECTION INFORMATION AS BEING IN THE FIRST DISPLAY STATE; OR DISPLAYING ANY VIDEO DETECTION INFORMATION AS BEING IN A SELECTED STATE ⟶ S205

FIG. 7

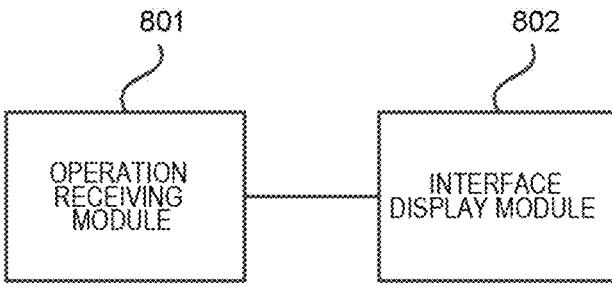

801             802

OPERATION RECEIVING MODULE      INTERFACE DISPLAY MODULE

FIG. 8

METHOD, APPARATUS, ELECTRONIC DEVICE AND STORAGE MEDIUM FOR DISPLAYING VIDEO

The present disclosure claims priority to the Chinese Patent Application No. 202110963513.2 filed on Aug. 20, 2021, which is hereby incorporated by reference in its entirety.

FIELD

The embodiments of the present disclosure relate to the field of video technology, such as a method, apparatus, electronic device, and storage medium for displaying a video in an interface.

BACKGROUND

In related solutions, a video publisher may view relevant data after the video is published, such as the total number of views, the total number of comments, the total number of likes, and/or the total number of sharing.

However, the way for presenting video-related data in related solutions is simple and lacks flexibility, which cannot meet the diverse needs of users, affecting user experience.

SUMMARY

The embodiments of the present disclosure provide a method, apparatus, electronic device, and storage medium for displaying a video in an interface to simplify an improvement process of the video.

In a first aspect, the embodiment of the present disclosure provides a method for displaying a video in an interface, including:

receiving a triggering operation for viewing a video detection interface; and in response to the triggering operation, displaying the video detection interface, wherein a video playback area and a playback progress bar of a video are displayed in the video detection interface, and at least one progress identification is presented on the playback progress bar, the progress identification is used for indicating video detection information corresponding to a playback progress.

In a second aspect, the embodiment of the present disclosure also provides an apparatus for displaying a video in an interface, including:

an operation receiving module configured to receive a triggering operation for viewing a video detection interface; and an interface display module configured to display the video detection interface in response to the triggering operation, wherein a video playback area and a playback progress bar of a video are displayed in the video detection interface, and at least one progress identification is presented on the playback progress bar, the progress identification is used for indicating video detection information corresponding to a playback progress.

In a third aspect, the embodiment of the present disclosure also provides an electronic device, including:

a processor; and a memory configured to store a program;

when the program is executed by the processor, the processor implements the method for displaying a video in an interface as described in the embodiments of the present disclosure.

In a fourth aspect, the embodiment of present disclosure also provides a computer-readable storage medium having a computer program stored thereon, and the computer program, when executed by a processor, implements the method for displaying a video in an interface as described in the embodiment of the present disclosure.

BRIEF DESCRIPTION OF THE DRAWINGS

In conjunction with the accompanying drawings and with reference to the following detailed description, the above and other features, advantages and aspects of the various embodiments of the present disclosure will become more apparent. Throughout the drawings, the same or similar reference numerals indicate the same or similar elements. It should be understood that the drawings are illustrative and that the originals and elements are not necessarily drawn to scale.

FIG. 1 is a schematic flowchart of a method for displaying a video in an interface provided by an embodiment of the present disclosure.

FIG. 2 is a schematic diagram of a video detection interface provided by an embodiment of the present disclosure.

FIG. 7 is a schematic flowchart of another method for displaying a video in an interface provided by an embodiment of the present disclosure.

FIG. 8 is a structural block diagram of an apparatus for displaying a video in an interface provided by an embodiment of the present disclosure.

DETAILED DESCRIPTION

Figure 3:
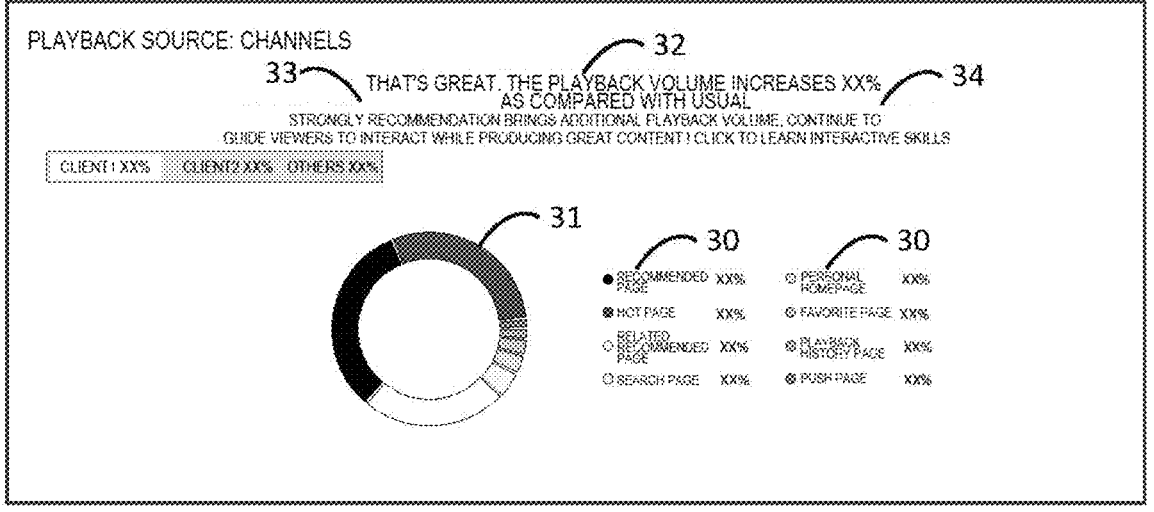
FIG. 3 is a schematic diagram of a playback channel display area provided by an embodiment of the present disclosure.

The following will describe the embodiments of the present disclosure with reference to the accompanying drawings. Although some embodiments of the present disclosure are shown in the drawings, it should be understood that the present disclosure can be implemented in various forms and should not be construed as limited to the embodiments set forth herein. On the contrary, these embodiments are provided for a more thorough and complete understanding of the present disclosure. It should be understood that the drawings and embodiments of the present disclosure are provided for illustrative purposes only.

It should be understood that the various steps described in the method implementation of this disclosure can be executed in different orders and/or in parallel. In addition, the method implementation can include additional steps and/or the steps as shown may be omitted. The scope of this disclosure is not limited in this regard.

The term "including" and its variations as used herein are non-exclusive inclusion, i.e. "including but not limited to". The term "based on" indicates "at least partially based on". The term "one embodiment" means "at least one embodiment": the term "another embodiment" indicates "at least one additional embodiment"; and the term "some embodiments" indicates "at least some embodiments". Relevant definitions of other terms will be given in the following description.

It should be noted that the concepts of "first" and "second" mentioned in this disclosure are only used to distinguish different apparatuses, modules, or units, but are not used to limit the order or interdependence of the functions performed by these apparatuses, modules, or units.

It should be noted that the modifications of "one" and "a plurality of" mentioned in this disclosure are illustrative but not limiting. Those skilled in the art should understand that unless otherwise indicated in the context, they should be understood as "one or more".

The names of the messages or information interacted between a plurality of apparatuses in this public implementation are for illustrative purposes only, which are not intended to limit the scope of these messages or information.

FIG. 1 is a schematic flowchart of a method for displaying a video in an interface provided by an embodiment of the present disclosure. The method may be performed by an apparatus for displaying a video in an interface, where the apparatus may be implemented by at least one of software and hardware, and may be equipped in an electronic device, typically, it may be equipped in a computer device. The method for displaying a video in an interface provided in an embodiment of the present disclosure is suitable for a scene of quickly viewing video segments having advantages or defects in a video. As shown in FIG. 1, the method for displaying a video in an interface provided by an embodiment of the present disclosure may include:

S101, receiving a triggering operation for viewing a video detection interface.

The triggering operation may be an operation for viewing a video detection interface of a video, such as an operation of triggering a control (such as a data analysis control) for instructing an electronic device to switch a current display interface to the video detection interface of the video. The video maybe a video published by a user. The video detection interface may be understood as a interface showing detection information of the video published by the user. The detection information may include a progress identification for indicating video detection information of the video, and it may also include at least one of a trend graph of the video (such as at least one of the playback information trend graph and interactive information trend graph) and playback channel information of the video.

For example, when a user wants to view the video detection interface of a video that he/she published, he/she may trigger a data analysis control corresponding to the video. Therefore, when the electronic device detects that the user triggers a detection interface detection control, the electronic device may determine that it has received a triggering operation for viewing the video detection interface.

S102, in response to the triggering operation, displaying the video detection interface, wherein a video playback area and a playback progress bar of a video are displayed in the video detection interface, and at least one progress identification is presented on the playback progress bar, the progress identification is used for indicating video detection information corresponding to a playback progress.

By indicating the playback progress of video detection information in the video through the progress identification, this embodiment may improve the flexibility of showing video detection information, which is conducive to meeting the diversified needs of users and improving the user experience.

The progress identification can be an identification configured to indicate a position where the video segment corresponding to the video detection information is in the playback progress bar of the video, that is the position of each video segment having the video detection information in the video can be indicated through the progress identification. The progress identification can be a display identification provided on the progress bar and different from or protruding from the progress bar itself. For example, at least one of the colors and shapes of the progress identification is different from the progress bar itself, for example, the color of the progress bar is gray, and the color of the progress identification is red, so that the progress identification is different from the progress bar.

The video detection information may be detection result information obtained by detecting the image quality sound quality, etc, of the video, and it may include positive detection information, such as detection result information obtained by detecting a video segment in the video with picture sharpness exceeding the first preset sharpness: it may also include negative detection information, such as detection result information obtained by detecting a video segment in the video with picture sharpness lower than the second preset sharpness, detection result information obtained by detecting a video segment in the video in which frames appear in the picture, etc. Optionally, the video detection information may include a suggestion for the creation of the video, that is, providing creative guidance information to guide the creator to improve the creation quality of the video. For example, it may include a suggestion for creating the video, that is, a video creation suggestion, which can include at least one of a positive video creation suggestion (such as an affirmative suggestion for affirming the advantages of the video) and a reverse video creation suggestion (such as an improvement suggestion for defects in the video).

For example, as shown in FIG. 2, when the electronic device detects that the user triggers the data analysis control of a video, it may display the video detection interface of the video, and show a cover of the video (or a video frame) and the playback progress bar 211 of the video in the video playback area 21 of the video detection interface, and show a progress identification 212 configured for indicating the video detection information corresponding to a playback progress on the playback progress bar 211.

In this embodiment, the video detection information may be generated by detecting and analyzing the video, and the generation method can be flexibly set. For example, the video detection information can be generated based on the playback data and interactive data of the video. The playback data may include the playback amount of the video at each time point (such as the number of viewers of the video at each time point), and the interactive data may include at least one of conversion rate, comment rate, bullet comment rate, like rate, strongly recommended rate, playback channel information (i.e., traffic source information), and viewer exit trend information of the video. It should be noted that the conversion rate of associated object may be a proportion of associated objects (such as viewers who follow the user) who watch the video among all viewers of the video: the comment rate may be a proportion of viewers who comment on the video among all viewers in the video: the bullet comment rate may be a proportion of viewers who send bullet comments in the video among all viewers in the video:

the like rate may be a proportion of viewers who like the video among all viewers in the video; the strong recommendation rate can be the proportion of viewers who strongly recommend the video among all viewers in the video.

In this embodiment, when the video detection interface is displayed, the video detection information can be displayed or not displayed, that is, when the video detection interface is displayed in response to the triggering operation for viewing the video detection interface, each video detection information may be displayed in the video detection interface, as shown in FIG. 2: or when the video detection interface is displayed in response to the triggering operation for viewing the video detection interface, the video detection information may not be displayed, for example, the video detection information indicated by a progress identification may be displayed in the video detection interface (such as on the upper layer of the video screen shown in the video playback area) when detecting an operation for triggering a progress identification displayed in the playback progress bar. In one implementation, the method for displaying a video in an interface provided in this embodiment further includes: in response to a triggering operation for any progress identification in the at least one progress identification, presenting the video detection information indicated by the progress identification in the video detection interface.

In the present embodiment, the video detection information is shown by triggering the progress identification, thus it is possible to enrich the interaction methods for obtaining video detection information and improve interface display space and flexibility, and also provide the possibility for diversely displaying the interface.

It can be understood that in this embodiment, when it is detected that the user triggers the progress identification, a video detection information panel may be shown in the video playback area (such as above the progress bar), and a plurality of pieces of video detection information corresponding to the current video is shown on the video detection information panel, which is convenient for users to quickly view the video detection suggestion, and synchronously watch the video detection suggestion and corresponding video pictures without shifting line of sight, thus shortening the path of viewing the video suggestion, avoiding blocking users from synchronously watching video pictures, and improving user experience. And in response to receiving a triggering operation for any one of the above plurality of pieces of video detection information, the video playback progress may be adjusted to a video segment corresponding to the video detection information.

In one implementation, at least one piece of playback channel information of the video is further shown in the video detection interface, and the method for displaying a video in an interface provided in this embodiment further includes: in response to a triggering operation for target playback channel information in the at least one piece of playback channel information, presenting a page thumbnail corresponding to the target playback channel information, wherein video information of the video is shown in the page thumbnail.

The playback channel information may be the playback source information of the video, that is, where the viewer watched the video. The playback source information may include at least one of recommended page, hot page, related recommended page, search page, personal homepage, favorite page, playback history page, and push page (such as push message page). The playback channel information may include pages in one or more clients, that is, the playback channel information may include the playback situation of a video in one client, or the playback situation of the video in a plurality of different clients. The triggering operation for the target playback channel information may be an operation for triggering playback channel information shown in the video detection interface or a corresponding proportion area in the playback channel proportion graph corresponding to the playback channel information, such as an operation of moving a cursor to an area where the playback channel information is located or a proportion area or an operation of clicking the playback channel information/proportion area. Correspondingly, the target playback channel information may be the playback channel information triggered by the triggering operation. The video information includes at least one of the video cover, title, profile picture and nickname of the user (i.e., publisher of the video).

Figure 4:
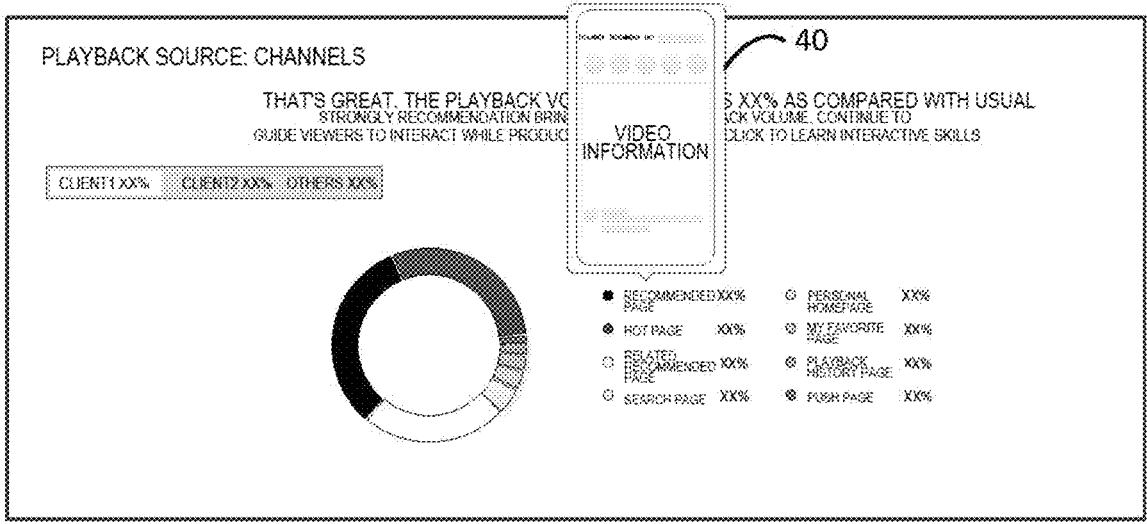
FIG. 4 is a schematic diagram of a page thumbnail provided by an embodiment of the present disclosure.

For example, the video detection interface may also include a playback channel showing area. As shown in FIG. 3 (taking playback channel information including playback channel information within a plurality of clients as an example), when the electronic device is displaying the video detection interface, playback channel information 30 of the video and a playback channel proportion graph 31 for characterizing playback volume proportion of respective pieces of playback channel information may be shown in the playback channel display area of the video detection interface. Therefore, when the user wants to view the interface situation of the playback interface corresponding to the playback channel information, he/she may trigger the playback channel information 30 or the proportion area in the playback channel proportion graph 31 corresponding to the playback channel information 30. Correspondingly, when the electronic device detects that the user triggers playback channel information 30 or the proportion area 31 corresponding to the playback channel information 30, the playback channel information 30 may be used as the target playback channel information, and the page thumbnail (indicated by reference sign 40 as shown in FIG. 4) containing video information of the video and corresponding to the playback channel information 30 can be displayed. In FIG. 4, by taking that the target playback channel information is the recommended page as an example, the user may clearly know the page layout of the page corresponding to the playback channel information 30 and/or the switching path for switching to enter the page corresponding to the playback channel information 30.

Continue to refer to FIG. 3, information 32 on the change in playback volume of the video compared to other videos published by the user, a creative suggestion 33 for the video generated based on the change information, and a guiding control 34 for the creative suggestion 33 may be shown in the playback channel showing area. Therefore, when the user wants to learn skills to improve video playback volume, the guiding control 34 can be triggered. Correspondingly, when the electronic device detects that the user triggers the guiding control 34, it may display guidance content corresponding to the creative suggestion 33 to guide the user to optimize the video or create better videos to improve the video playback volume.

In one implementation, at least one piece of associated object source information is further shown in the video detection interface, and the method for displaying a video in an interface provided in this embodiment further includes: in response to a triggering operation of target associated object source information in the at least one piece of associated object source information, presenting target content published by a publisher of the video, where the target content is multimedia content of a type that matches the target associated object source information.

The associated object can be an object that has a following relationship with the user (i.e., the publisher of the video shown in the video detection interface), such as other users who follow the publisher of the video. Correspondingly, the associated object source information may include the way the associated object follows the user, that is, the way in which the associated object follows the user, it may include at least one of horizontal screen video, vertical screen video, LIVE, and the articles, etc. The triggering operation for the target associated object source information may be an operation for triggering associated object source information shown on the video detection interface or a proportion area in an associated object source proportion graph corresponding to the associated object source information, such as an operation of moving the cursor to an area where an associated object source information is located or a proportion area, or an operation of clicking on associated object source information/proportion area, etc. Correspondingly, the target associated object source information can be the associated object source information triggered by the triggering operation. Multimedia content can include at least one of horizontal screen video, vertical screen video. LIVE, and the articles, etc.

Figure 5:
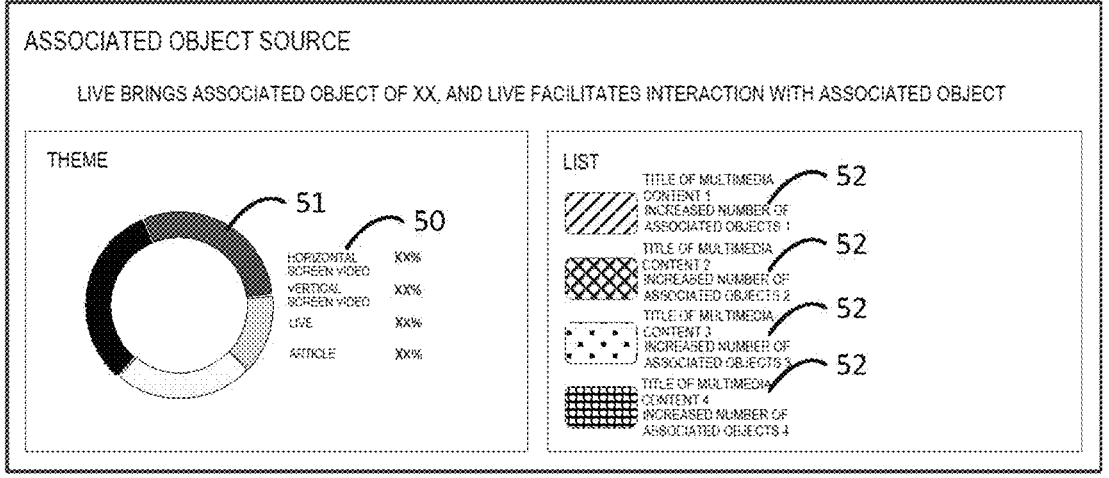
FIG. 5 is a schematic diagram of an associated object source showing area provided by an embodiment of the present disclosure.

For example, the video detection interface may also include an associated object source showing area. As shown in FIG. 5, when the electronic device is displaying the video detection interface, the user's associated object source information 50 and an associated object source proportion graph 51 configured to characterize proportions of the number of the associated objects corresponding to individual pieces of associated object source information 50 are shown in the associated object source showing area of the video detection interface. Therefore, when the user wants to view the multimedia content that he/she published and matches the associated object source information 50, he/she may trigger the associated object source information 50 or the area in the associated object source proportion graph 51 corresponding to the associated object source information 50. Correspondingly, when the electronic device detects that the user triggers a piece of associated object source information 50 or a proportion area corresponding to a piece of associated object source information 50, the piece of associated object source information 50 can be taken as the target associated object source information, and multimedia content published by the user and matches the associated object source information 50 can be displayed. For example, a preset number of pieces of multimedia content (such as 4, etc.) can be selected from the multimedia content published by the user and that matches the associated object source information 50, according to a descending order of the number of associated objects (i.e., the number of associated objects increased by means of the corresponding multimedia content), and the information 52 of the multimedia content is shown. Furthermore, the user may trigger information 52 of multimedia content to view the multimedia content.

In one implementation, a publisher creation suggestion is further shown in the video detection interface, and the method for displaying a video in an interface provided in this embodiment further includes: in response to a triggering operation for a guiding control for the publisher creation suggestion, presenting guiding content corresponding to the publisher creation suggestion to guide a publisher of the video to create based on the publisher creation suggestion.

The publisher creation suggestion can be understood as a creation suggestion in a perspective of the publisher, that is, the creation suggestion for the publisher of the video (i.e, the user). The publisher creation suggestion may be generated based on at least one of the playback data, interactive data, associated object information (such as the number of associated objects, associated object source, and associated object preference), and viewer information of individual pieces of multimedia content published by the user. The triggering operation for the guiding control for publisher creation suggestion can be an operation for triggering the guiding control corresponding to the publisher creation suggestion.

Figure 6:
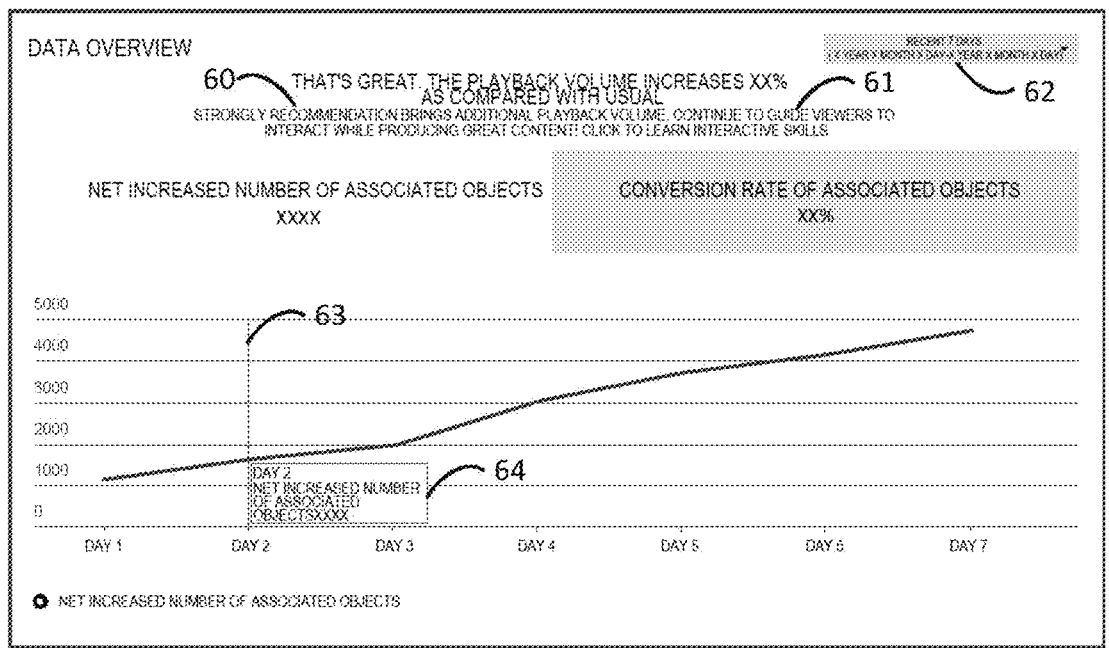
FIG. 6 is a schematic diagram of a data overview area provided by an embodiment of the present disclosure.

As an example, the video detection interface may also include a data overview area. As shown in FIG. 6, when the electronic device is displaying the video detection interface, the guiding control 61 and the publisher creation suggestion 60 generated for creative features of the user (such as creative advantages and/or defects) may be displayed in the data overview area of the video detection interface. Therefore, when the user wants to learn the creative skills of the publisher creative suggestion 60, the guiding control 61 can be triggered. Correspondingly, when the electronic device detects that the user triggers the guiding control 61, it may display guiding content corresponding to the publisher creation suggestion 60 to guide the user to create better multimedia content and improve the user experience.

As shown in FIG. 6, the electronic device may also display the preset data information of the user and a corresponding curve thereof in the data overview area, such as the net follower growth amount of the user (corresponding to the net growth amount of the associated objects in FIG. 6) and a time-net follower growth amount curve graph (i.e., the curve configured to characterize the user's net follower growth amount at different times), the playback conversion rate information of the user (corresponding to the conversion rate of the associated object in FIG. 6), and a user's time-playback conversion rate curve graph (i.e., the curve configured to characterize the user's playback conversion rate at different times), and a range adjustment control 62 for the user to adjust the time range shown by the curve graph, so that the user can adjust the time range shown in the curve graph by triggering the range adjustment control 62. The curve graph can be provided with an icon 63, and the user may drag the icon to view the user's ordinate value on different dates. For example, when the user clicks or moves the cursor to the icon 63, the abscissa value (that is, time, such as date) and the ordinate value (such as net follower growth amount or playback conversion rate) of the curve at the time point where the icon is located may be displayed in the form of a floating window 64.

The method for displaying a video in an interface provided in this embodiment receives a triggering operation for viewing a video detection interface: in response to the triggering operation, displays a video detection interface, and shows a playback progress bar of the video in a video playback area of the video detection interface, where the playback progress bar is shown with at least one progress identification for indicating video detection information corresponding to the corresponding playback progress. With the above technical solution, by indicating the playback progress of video detection information in the video through the progress identification, this embodiment can improve the flexibility of showing video detection information, which meets the diversified needs of users and improve the user experience.

FIG. 7 is a schematic flowchart of another method for displaying a video in an interface provided in the embodiment of the present disclosure. The solution in this embodiment can be combined with one or more optional solutions in the above embodiments. Optionally, the video detection information indicated by the progress identification is further shown in the video detection interface. The method for displaying a video in an interface provided in this embodiment further includes: in response to a presenting operation for a target video segment corresponding to target video detection information, presenting the target video segment in the video playback area, displaying the target progress identification for indicating the target video detection information as being in a first display state, and displaying other progress identifications other than the target progress identification as being in a second display state.

Optionally, the method for displaying a video in an interface provided in this embodiment further includes: in response to a presenting operation for a target video segment corresponding to target video detection information, displaying the target video detection information as in a selected state.

Optionally, the video detection interface is also shown with s a trend graph of the video. The method for displaying a video in an interface provided in this embodiment further includes: in response to the presenting operation for the target video segment corresponding to the target video detection information, adjusting the target icon in the trend graph to a position matching a time point corresponding to the presenting operation, and displaying the time segment in the trend graph corresponding to the target video segment in a preset display state.

Optionally, the method for displaying a video in an interface provided in this embodiment further includes: in response to a triggering operation for playing the video, playing the video, and adjusting a position of the progress point in the playback progress bar and a position of the target icon in the trend graph according to playback progress of the video: when the video is played to a video segment corresponding to any video detection information, perform at least one of the following steps: displaying a progress identification indicating the video detection information as the first display state; displaying the video detection information as in a selected state.

Correspondingly, as shown in FIG. 7, the method for displaying a video in an interface provided in this embodiment may include:

S201, receiving a trigger operation for viewing a video detection interface.

S202, in response to the triggering operation, displaying the video detection interface and performing S203 or S204, wherein a video playback area, a playback progress bar of a video, video detection information indicated by at least one progress identification shown on the progress bar, and a trend graph of the video are displayed in the video detection interface.

The trend graph may be a curve graph used to characterize change trend of corresponding parameters at various time points of the video. The trend graph may include at least one of the playback information trend graph and the interactive information trend graph. The playback information trend graph may be a trend graph indicating the proportion change of the users who continue to watch the video. The interactive information trend graph may include at least one of a trend graph indicating a change in the number of bullet comments, a trend graph indicating a change in the number of followers, a trend graph indicating a change in the number of likes, and a trend graph indicating a change in the number of comments. Correspondingly, the trend graph indicating change in the number of likes of the video is a trend graph indicating change in the number of likes obtained by the video with the playback progress time of the video. The trend graph indicating change in the number of bullet comments and the trend graph indicating change in the number of followers of the video is similar and will not be repeated here.

In this embodiment, when the video detection interface is displayed in response to the triggering operation for viewing the video detection interface, video detection information, such as forward video detection information and reverse video detection information, is displayed in the video detection interface. The forward video detection information and the reverse video detection information may be located in the same area or may be not located in the same area. For example, only one suggestion showing area may be provided, and each of pieces of video detection information may be shown in the suggestion showing area. For example, the video detection information may be shown in the showing area according to an order of video segments in the video corresponding to individual pieces of video detection information. At least two suggestion showing areas may also be provided, and the forward video detection information may be displayed in one of the suggestion showing areas as provided, and the reverse video detection information may be displayed in another suggestion showing area as provided.

Considering that users may have different following levels to different types of video detection information, in this embodiment, the forward video detection information and the reverse video detection information may be shown in different areas. At this time, optionally, the video detection interface includes a first suggestion showing area and a second suggestion showing area. The first suggestion showing area is provided to show the forward video detection information of the video, and the second suggestion showing area is provided to show the reverse video detection information of the video.

Optionally, the first suggestion showing area may be an area for showing the forward video detection information of the video: the second suggestion showing area may be an area for showing the reverse video detection information of the video.

As an example, the content of each part of the video can be scored based on the playback data and interactive data of the video at each time point, and high-quality video segments with ratings higher than the first threshold and low-quality video segments with ratings lower than the second threshold can be obtained, as well as the forward video detection information for high-quality video segments and reverse video detection information for low-quality video segments. Therefore, when the electronic device displays the video detection interface, as shown in FIG. 2, the forward video detection information of the video may be shown in the first suggestion showing area 201 of the video detection interface, and the reverse video detection information of the video may be shown in the second suggestion showing area 202 of the video detection interface. It is worth noting that this embodiment does not limit the scoring method for the video, and the first threshold is greater than or equal to the second threshold.

In this embodiment, the video detection interface may also include a trend graph showing area. Therefore, when the electronic device displays the video detection interface in response to the triggering operation for viewing the video detection interface, it may also show at least one trend graph of the video in the trend graph showing area of the video detection interface, as shown in FIG. 2, so that the user can understand the changing trend of at least one of the playback situation and interactive situation of the video.

As shown in FIG. 2, a target icon 22 for characterizing the playback progress of the video can be provided in the trend graph. Users may drag the target icon 22 to view the ordinate value of the user at different time points. For example, the electronic device may control the target icon 22 to move with the dragging operation of the user. When detecting that the user stops dragging, clicking, or moving the cursor to the target icon 22, the abscissa value (that is, time, such as date) and the ordinate value (proportion of users continuing to view the video, the number of bullet comments, the number of followers, the number of likes or comments) of the change curve in the trend graph at the abscissa corresponding to the target icon 22 is displayed in the form of a floating window 23. The time value corresponding to the target icon 22 and the time value corresponding to the progress point 213 in the playback progress bar 211 are the same as the time value corresponding to the time point currently shown in the video, and the progress point 213 can be used to identify the current playback position of the video.

In this embodiment, the user may switch the trend graph displayed in the trend graph display area through a trend graph switching operation. Optionally, the method for displaying a video in an interface provided in this embodiment further includes: receiving a trend graph switching operation: in response to the trend graph switching operation, switching the trend graph shown in the video detection interface.

The trend graph switching operation may be an operation for instructing the electronic device to switch the trend graph displayed in the trend graph display area, such as an operation for triggering a trend graph name of a trend graph.

For example, as shown in FIG. 2, the electronic device shows at least one trend graph in the trend graph display area and displays the trend graph name 24 of individual trend graphs. Therefore, when a user wants to view a trend graph, they can trigger the trend graph name 24 of the trend graph. Correspondingly, when the electronic device detects that the user triggers the trend graph name 24 of a trend graph, it may be determined that the electronic device has received a trend graph switching operation for the trend graph, and in response to the trend graph switching operation, show the trend graph in the trend graph showing area, such as switching a trend graph currently shown in the trend graph display area to the trend graph.

In one implementation, when the video detection interface is displayed in response to a triggering operation for viewing the video detection interface, video detection information indicated by the progress identification can be shown in the video detection interface. At this time, the displaying the video detection interface includes at least one of the following steps: displaying one progress identification in the at least one progress identification as being in a first display state, and displaying other progress identifications other than the one progress identification as a second display state; and displaying the video detection information indicated by the progress identification in the at least one progress identification as being in in a selected state.

The progress identification may include two display states: the first display state and the second display state. In the first display state, the progress identification can simultaneously identify the starting position and ending position of a progress interval in playback progress bar that corresponds to a video segment corresponding to the video detection information indicated by the progress identification (such as the rectangular progress identification on the leftmost side of FIG. 2). In the second display state, the progress identification may only identify the position of a point within a progress interval (such as the starting point, ending point, or midpoint) in the playback progress bar that corresponds to a video segment corresponding to the video detection information indicated by the progress identification (such as the dotted progress identification in FIG. 2).

It should be noted that both the first display state and the second display state can be flexibly set as needed. The first display state is not limited to the rectangular style, and the second display state is not limited to the dot style. For example, the first display state can be a style of round block or circle, and the second display state can be a style of vertical line or slash, etc.

In one implementation, when the video detection interface is displayed in response to the triggering operation for viewing the video detection interface, a piece of video detection information (such as the first video detection information) may be selected by default, that is, a piece of video detection information is displayed as in a selected state by default, and the playback progress of the video may be switched to a progress that matches the video detection information (such as switching to a starting position of a video segment corresponding to the video detection information): the progress point 213 in the playback progress bar 211 and the target icon 22 in the trend graph are adjusted to a position that matches the time value corresponding to the interface display progress of the video, the progress identification 212 of the video segment corresponding to the video detection information in the playback progress bar is displayed as the first display state, the progress identification 212 of the video segment corresponding to other video detection information in the playback progress bar is displayed as the second display state, and the corresponding time segment 25 of the video segment corresponding to the video detection information in the trend graph is displayed as a preset display state, as shown in FIG. 2 (in the drawing, taking that the first video detection information is selected as an example).

In another implementation, when the video detection interface is displayed in response to the triggering operation for viewing the video detection interface, a progress identification 212 (such as the first progress identification 212 in the playback progress bar 211) can be displayed as the first display state by default, other progress identifications 212 in the playback progress bar 211 can be displayed as the second display state, and the playback progress of the video can be switched to a progress corresponding to the progress identification 212 (such as switching to a starting position of the video segment corresponding to the video detection information indicated by the progress identification 212); the progress point 213 in the playback progress bar 211 and the target icon 22 in the trend graph are adjusted to a position that matches the time value corresponding to the playback progress of the video, the video detection information indicated by the progress identification 212 is displayed as in a selected state, the video detection information indicated by other progress identifications 212 is displayed as in an unselected state, and the corresponding time segment 25 of the video segment corresponding to the video detection information displayed as in a selected state in the trend graph is displayed as in a preset display state 25, as shown in FIG. 2 (in the drawing, taking that the first progress identification 212 in the playback progress bar 211 is displayed as the first display state as an example).

S203, in response to a presenting operation for a target video segment corresponding to target video detection information, presenting the target video segment in the video playback area, displaying the target progress identification for indicating the target video detection information as being in a first display state, displaying other progress identifications other than the target progress identification as being in a second display state, displaying the target video detection information as in a selected state, adjusting the target icon in the trend graph to a position matching a time point corresponding to the presenting operation, and displaying a time segment in the trend graph corresponding to the target video segment in a preset display state.

The presenting operation may be an operation for showing any video segment having corresponding video detection information (including at least one of forward video detection information and reverse video detection information), such as an operation for triggering video detection information, or moving the progress point in the video playback progress bar to a playback progress bar interval corresponding to any video segment having the corresponding video detection information. The target video segment may be a video segment corresponding to the presenting operation, that is, the video segment shown by the presenting operation. The target video detection information may be the video detection information corresponding to the target video segment, that is, the video detection information for the target video segment.

In this embodiment, when a trend graph of a video is shown in the trend graph showing area of the video detection interface, in addition to instructing the electronic device to show a corresponding video segment by triggering the video detection information or moving the progress point in the playback progress bar to a progress interval of the video segment corresponding to the video detection information, the user may also instruct the electronic device to show the video segment by dragging the target icon in the trend graph to a time segment in the trend graph that corresponds to a video segment corresponding to the video detection information. Optionally, a trend graph of the video is also shown in the video detection interface, and the presenting operation includes at least one of the following triggering operations: a first triggering operation for any video detection information displayed in the video detection interface: a second triggering operation for moving a progress point in the playback progress bar into a progress interval corresponding to the target video segment; and a third triggering operation for moving a target icon in the trend graph into a time segment corresponding to the target video segment, where the trend graph includes at least one of a playback information trend graph and an interactive information trend graph. The first triggering operation may be an operation of triggering (such as clicking) the target video detection information: the second trigger operation may be an operation of moving the progress point in the playback progress bar into a progress interval corresponding to the target video segment, which can be an operation of dragging the progress point in the playback progress bar into the progress interval corresponding to the target video segment, or an operation of clicking a position in the progress interval corresponding to the target video segment, such as clicking a progress indicator shown in the progress bar. Optionally, the second trigger operation includes a triggering operation for a target progress identification for indicating the target video detection information. The third trigger operation may be an operation of dragging the target icon in the trend graph to the time segment corresponding to the target video segment.

Taking a trend graph shown on the video detection interface as an example, the electronic device shows the video detection information of the video in a suggestion showing area and shows the playback progress bar of the video in the video playback area. When a user wants to view a video segment corresponding to a piece of video detection information, he/she may trigger (such as click) the video detection information: when the user wants to view a video segment or determine video detection information corresponding to the video segment, he/she can move the progress point in the playback progress bar to a progress interval where the video segment is located or move the target icon in the trend graph to a time segment corresponding to the video segment. Correspondingly, when the electronic device detects that the user triggers the video detection information, moves the progress point into a progress area of a video segment having corresponding video detection information, or moves the target icon to a time segment of a video segment having corresponding video detection information, it may be determined that a presenting operation for the target video segment is received, and the video detection information triggered by the user can be taken as the target video detection information, and the video segment corresponding to the target video detection information can be taken as the target video segment; or, the video segment corresponding to the progress point or a position of target icon after movement is taken as the target video segment, the video detection information corresponding to the target video segment is taken as the target video detection information, and in response to the presenting operation, the progress point in the playback progress bar and the target icon in the trend graph are adjusted to a position matching the time point of the presenting operation, the video detection information corresponding to the target video segment is displayed as in a selected state, other video detection information except the target video detection information is displayed as in a unselected state, the progress identification of the target video segment is displayed as the first display state, the progress identifications of other video segments except the target video segment are displayed as the second display state, and the time segment in the trend graph corresponding to the target video segment is displayed as a preset display state, as shown in FIG. 2 (taking that the target video detection information is the first video detection information as an example).

In this embodiment, each piece of video detection information of the video can be generated and shown, and based on the user's triggering operation, the video detection information corresponding to the triggering operation are shown in the selected state and the corresponding video segment is also shown. The user does not need to determine a video segment in the video that needs to be improved by repeatedly watching the video or seek for an improvement method for the video segment, nor does he/she need to artificially determine the video detection information corresponding to the currently played video segment based on the current position of the progress point. Therefore, the user may quickly determine the video segment that needs to be modified and then modify the determined segment, which may simplify the modification process of published videos, reduce the time spent by users in modifying published videos, and improve the efficiency of video modification and the quality of the modified videos.

S204, in response to the triggering operation for playing the video, playing the video, and adjusting the position of the progress point in the playback progress bar and the position of the target icon in the trend graph according to the playback progress of the video.

The triggering operation for playing the video can be an operation for instructing the electronic device to play the video, such as triggering the play/pause control in the video playback area when the playback of the video is paused.

For example, when the electronic device initially displays the video detection interface, the video can be shown in a paused state, or when the electronic device responds to the user's presenting operation, the video can be kept as it was before receiving the presenting operation (such as paused state or playback state). Therefore, when the video is in the paused state, if the user wants to watch the video, the play/pause control 214 in the video playback area can be triggered (as shown in FIG. 2). Correspondingly, when the electronic device detects that the user triggers the play/pause control 214 in the video playback area when the video is in the paused state, it can play the video by taking a time point corresponding to the position of the progress point 213 in the playback progress bar as a starting point for playback, and during the playback, adjusts in real time the position of the progress point 213 in the playback progress bar and the position of the target icon 22 in the trend graph according to the time point to which the video is currently played, so that the corresponding time value is the same as the time value corresponding to the time point to which the video is currently played.

S205, when the video is played to a video segment corresponding to any video detection information, performing at least one of the following steps: displaying the progress identification indicating the video detection information as the first display state: displaying any video detection information as in a selected state.

In this embodiment, during the video playback process, when playing any video segment in the video corresponding to any video detection information, that is, when playing a video segment having corresponding video detection information in the video, the progress identification 212 of the video segment having the corresponding video detection information currently being played can be displayed as the first display state, and other progress identifications of video segment having the corresponding video detection information can be displayed as the second display state; and/or, the video detection information corresponding to the video segment having corresponding video detection information and currently being played can be displayed as the selected state, and other video detection information can be displayed as unselected state: the time segment 25 corresponding to the video segment having corresponding video detection information and currently being played in the trend graph can also be displayed as a preset display state, and the time segments in the trend graph corresponding to other video segments can be displayed as a non-preset display state, as shown in FIG. 2 (in the drawing, taking that the video segment corresponding to the first video detection information is being played as an example), so that the user may clearly know the currently played video segment, the video detection information corresponding to the currently played video segment, and the time segment 25 in the trend graph corresponding to the currently played video segment.

The method for displaying a video in an interface provided by this embodiment can realize linkage between the suggestion display area, the video playback area, and the trend graph display area, so that the user can quickly determine the video detection information corresponding to the currently played video segment and its corresponding curve segment in the trend graph, and/or quickly determine the video segment in the video corresponding to the currently viewed video detection information and the curve segment in the trend graph corresponding to the video segment, which can not only provide convenience for the user to determine the video segment that needs to be modified in the video, improve the video modification efficiency of the user, but also enable the user to quickly determine the modification method corresponding to each video segment and improve the quality of the modified video.

FIG. 8 is a structural diagram of an apparatus for displaying a video in an interface provided by an embodiment of the present disclosure. The apparatus can be implemented by at least one of software and hardware, and can be configured in an electronic device. Typically, it can be configured in a computer device, which may quickly show the video detection information and a video segment corresponding to each video detection information by executing a method for displaying a video in an interface. As shown in FIG. 8, the apparatus for displaying a video in an interface provided in this embodiment may include an operation receiving module 801 and an interface display module 802.

The operation receiving module 801 is configured to receive a triggering operation for viewing a video detection interface.

The interface display module 802 is configured to display the video detection interface in response to the triggering operation, where a video playback area and a playback progress bar of a video are displayed in the video detection interface, at least one progress identification is presented on the playback progress bar, and the progress identification is used for indicating video detection information corresponding to a playback progress.

The apparatus for displaying a video in an interface provided in this embodiment receives a triggering operation for view the video detection interface by the operation receiving module: displays the video detection interface by the interface display module in response to the triggering operation, and shows a playback progress bar of a video in a video playback area of the video detection interface, where at least one progress identification configured to indicate video detection information corresponding to a playback progress is presented on the playback progress bar. With the above technical solution, by indicating the playback progress of video detection information in the video through the progress identification, this embodiment can improve the flexibility of showing video detection information, which meets the diversified needs of users and improve the user experience.

In the above solution, the video detection information indicated by the progress identification is further shown in the video detection interface. The apparatus for displaying a video in an interface provided in this embodiment may also include a presenting operation response module configured to: in response to a presenting operation for the target video segment corresponding to the target video detection information, show the target video segment in the video playback area, display a target progress identification for indicating the target video detection information as being in a first display state, and display other progress identifications other than the target progress identification as being in a second display state.

In the above solution, the presenting operation response module may also be configured to display the target video detection information as in a selected state in response to the presenting operation for the target video segment corresponding to the target video detection information.

Optionally, a trend graph of the video is further shown in the video detection interface, and the presenting operation may include at least one of the following triggering operations: a first triggering operation for any video detection information displayed in the video detection interface: a second triggering operation for moving a progress point in the playback progress bar into a progress interval corresponding to the target video segment; and a third triggering operation for moving a target icon in the trend graph into a time segment corresponding to the target video segment, wherein the trend graph includes at least one of a playback information trend graph and an interactive information trend graph.

In the above solution, the second triggering operation may include a triggering operation for a target progress identification for indicating the target video detection information.

In the above solution, the presenting operation response module may also be configured to: in response to the presenting operation for the target video segment corresponding to the target video detection information, adjust the target icon in the trend graph to a position matching a time point corresponding to the presenting operation, and display the time segment in the trend graph corresponding to the target video segment in a preset display state.

Optionally, the apparatus for displaying a video in an interface provided in this embodiment may further include: a video playback module configured to: in response to a triggering operation for playing the video, play the video, and adjust a position of the progress point in the playback progress bar and a position of the target icon in the trend graph according to playback progress of the video; and a state display module configured to perform at least one of the following steps when the video is played to a video segment corresponding to any video detection information: display a progress identification indicating the video detection information as the first display state: display the video detection information as in a selected state.

In the above solution, the video detection information indicated by the progress identification is further shown in the video detection interface, and the interface display module 802 may also be configured to perform at least one of the following steps: display one progress identification in the at least one progress identification as being in a first display state, and display other progress identifications other than the one progress identification as a second display state; and display the video detection information indicated by the progress identification in the at least one progress identification as in a selected state.

In the above solution, at least one piece of playback channel information of the video may also be shown in the video detection interface. The apparatus for displaying a video in an interface provided in this embodiment can also include: a thumbnail showing module configured to show a page thumbnail corresponding to the target playback channel information, in response to a triggering operation for target playback channel information in the at least one piece of playback channel information, where video information of the video is shown in the page thumbnail.

In the above solution, at least one piece of associated object source information is further shown in the video detection interface. The apparatus for displaying a video in an interface provided in this embodiment may also include: a multimedia content showing module configured to show target content published by a publisher of the video in response to a triggering operation of target associated object source information in the at least one piece of associated object source information, where the target content is multimedia content of a type that matches the target associated object source information.

In the above solution, a publisher creation suggestion is further shown in the video detection interface. The apparatus for displaying a video in an interface provided in this embodiment may also include: a suggestion guiding module, configured to show guiding content corresponding to the publisher creation suggestion to guide a publisher of the video to create based on the publisher creation suggestion, in response to a triggering operation for a guiding control for the publisher creation suggestion.

Optionally, the apparatus for displaying a video in an interface provided in this embodiment may further include: a suggestion showing module configured to show the video detection information indicated by the progress identification in the video detection interface in response to a triggering operation for any progress identification in the at least one progress identification.

The apparatus for displaying a video in an interface provided in the present embodiment can execute the method for displaying a video in an interface provided in any embodiment of the present disclosure, and has the corresponding functional modules and beneficial effects of executing the method for displaying a video in an interface. Technical details that are not described in detail in this embodiment may be found in the method for displaying a video in an interface provided in any embodiment of the present disclosure.

Figure 9:
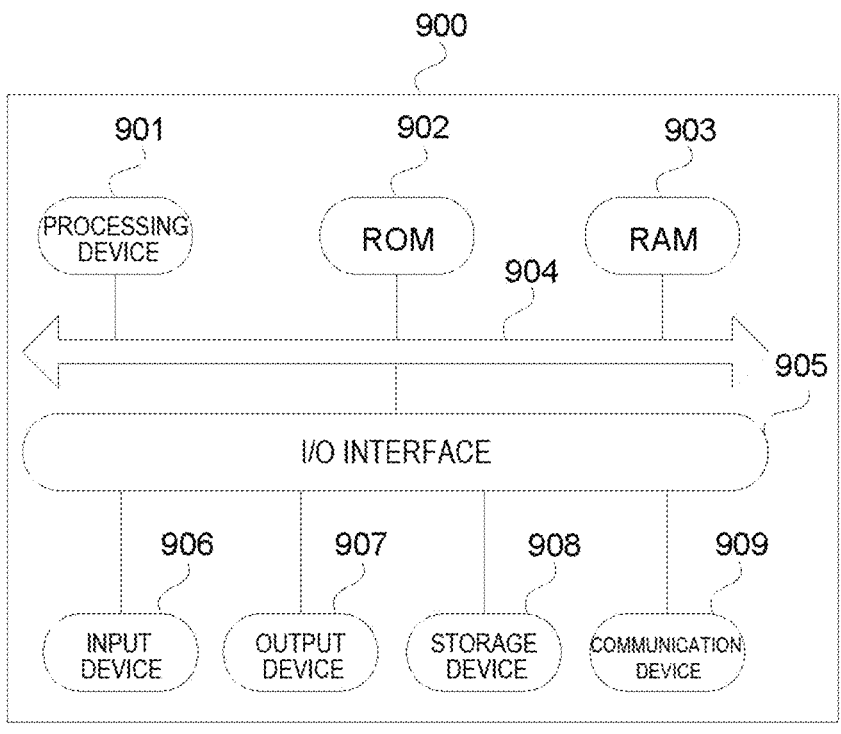
FIG. 9 is a structural schematic diagram of an electronic device provided by an embodiment of the present disclosure.

Referring to FIG. 9 below, there is shown a schematic structural diagram of an electronic device (e.g., a computer device) 900 suitable for implementing an embodiment of the disclosure. The terminal devices in the disclosure may include mobile terminals such as mobile phones, laptops, digital broadcast receivers, personal digital assistants (PDAs), tablets (Portable Android Devices, PAD), portable media players (PMPs), car-mounted terminals (e.g., car navigation terminals), and fixed terminals such as digital televisions (i.e., digital TVs), desktop computers, etc. It should be noted that the electronic device shown in FIG. 9 is only an example.

As shown in FIG. 9, the electronic device 900 may include a processing device (such as a central processing unit, graphics processing unit, etc.) 901, which may perform various appropriate actions and processes based on programs stored in Read-Only Memory (ROM) 902 or loaded from storage device 906 into Random Access Memory (RAM) 903. In the RAM 903, various programs and data necessary for the operation of the electronic device 900 are also stored. The processing device 901. ROM 902, and RAM 903 are connected to each other through a bus 904. An Input/Output I/O interface 905 is also connected to the bus 904.

Typically, the following devices may be connected to I/O interface 905: an input device 906 including, for example, touch screens, touchpads, keyboards, mice, cameras, microphones, accelerometers, gyroscopes, etc.; an output device 907 including liquid crystal displays (LCDs), speakers, vibrators, etc.; a storage device 906 including magnetic tapes, hard disks, etc.; and a communication device 909. The communication device 909 may allow the electronic device 900 to communicate with other devices wirelessly or wirelessly to exchange data. Although FIG. 9 shows an electronic device 900 with a plurality of devices, it shall be understood that it is not required to implement or have all of the devices shown. More or fewer devices may be implemented or provided instead.

In particular, according to embodiments of the present disclosure, the process described above with reference to the flowchart can be implemented as a computer software program. For example, an embodiment of the present disclosure includes a computer program product that includes a computer program carried on a non-transitory computer-readable medium, where the computer program includes program code for performing the method shown in the flowchart. In such an embodiment, the computer program can be downloaded and installed from a network through the communication device 909, or installed from the storage device 906, or installed from the ROM 902. When the computer program is executed by the processing device 901, the above functions defined in the method of the embodiment of the present disclosure are performed.

It should be noted that the computer-readable medium described above can be a computer-readable signal medium or a computer-readable storage medium, or combination thereof. Optionally, the computer-readable storage medium can be an electrical, magnetic, optical, electromagnetic, infrared, or semiconductor system, apparatus, or device, or suitable combination thereof. Examples of computer-readable storage media may include but are not limited to: an electrical connection with one or more wires, a portable computer disk, a hard disk, random access memory (RAM), read-only memory (ROM), an erasable programmable read-only memory (EPROM or flash memory), an optical fiber, a portable compact disk read-only memory (CD-ROM), an optical storage device, a magnetic storage device, or suitable combination thereof. In the present disclosure, a computer-readable storage medium may be, for example, tangible medium containing or storing a program that can be used by an instruction execution system, apparatus, or device, or can be used in combination with an instruction execution system, apparatus, or device. In the present disclosure, a computer-readable signal medium can include a data signal propagated in baseband or as part of a carrier wave, which carries computer-readable program code therein. Such propagated data signals may take many forms, for example, they may include electromagnetic signals, optical signals, or any combination thereof. A computer-readable signal medium may also be other computer-readable medium other than a computer-readable storage medium, which can send, propagate, or transmit programs for use by or in conjunction with instruction execution systems, apparatus, or devices. The program code contained on the computer-readable medium may be transmitted using any suitable medium, for example, including: wires, optical cables. RF (radio frequency), etc., or any combination thereof.

In some implementations, clients and servers can communicate using currently known or future developed network protocol such as Hyper Text Transfer Protocol (HTTP), and can be interconnected with other form or medium of digital data communication (such as communication networks). Examples of communication networks include local area networks (LANs), wide area networks (WANs), internetworks (such as the Internet), and end-to-end networks (such as Ad hoc end-to-end networks), as well as currently known or future developed networks.

The computer-readable medium can be included in the electronic device, or it can exist alone without being assembled into the electronic device.

The above-mentioned computer-readable medium carries one or more programs, and when the above-mentioned one or more programs are executed by the electronic device, the electronic device: receives a trigger operation for viewing a video detection interface: in response to the trigger operation, displays a video detection interface, wherein a video playback area and a playback progress bar of a video are shown in the video detection interface, and at least one progress identification is displayed on the playback progress bar, and the progress identification is used for indicating the video detection information corresponding to the corresponding playback progress.

Computer program codes for performing the operations of the present disclosure may be written in one or more programming languages or a combination thereof, including but not limited to Object Oriented programming languages—such as Java. Smalltalk. C++, and also conventional procedural programming languages—such as "C" or similar programming languages. The program code may be executed entirely on the user's computer, partially executed on the user's computer, executed as a standalone software package, partially executed on the user's computer and partially on a remote computer, or entirely on a remote computer or server. In the case of involving a remote computer, the remote computer may be any kind of network—including local area network (LAN) or wide area network (WAN)—connected to the user's computer, or may be connected to an external computer (e.g., through an Internet service provider to connect via the Internet).

For the beneficial effects of the electronic devices, programs, and storage media of the disclosed embodiments, analysis on the beneficial effects of the above methods may be referred to, which will not be repeated here.

The flowcharts and block diagrams in the accompanying drawings illustrate the architecture, functions, and operations of possible implementations of the system, method, and computer program product according to various embodiments of the present disclosure. In this regard, each block in a flowchart or block diagram may represent a module, program segment, or portion of code that contains one or more executable instructions for implementing a specified logical function. It should also be noted that in some alternative implementations, the functions marked in the blocks may occur in a different order than those marked in the drawings. For example, two consecutive blocks may actually be executed in parallel, or they may sometimes be executed in reverse order, depending on the function involved. It should also be noted that each block in the block diagrams and/or flowcharts, as well as combinations of blocks in the block diagrams and/or flowcharts, may be implemented using a dedicated hardware-based system that performs the specified function or operations, or may be implemented using a combination of dedicated hardware and computer instructions.

The units described in the embodiments of the present disclosure can be implemented by software or hardware. It should be noted that the name of the module does not constitute a limitation on the unit itself in some cases.

The functions described herein above can be performed at least in part by one or more hardware logic components. For example, without limitation, exemplary types of hardware logic components that may be used include: Field Programmable Gate Arrays (FPGAs), Application Specific Integrated Circuits (ASICs), Application Specific Standard Parts (ASSPs), System on Chip (SOCs), Complex Programmable Logic Devices (CPLDs), and so on.

In the context of this disclosure, a machine-readable medium can be a tangible medium that may contain or store programs for use by or in conjunction with instruction execution systems, apparatuses, or devices. A machine-readable medium may be a machine-readable signal medium or a machine-readable storage medium. A machine-readable medium may include electronic, magnetic, optical, electromagnetic, infrared, or semiconductor systems, apparatuses, or devices, or suitable combination thereof. Examples of the machine-readable storage medium may include electrical connections based on one or more wires, portable computer disks, hard disks, random access memory (RAM), read-only memory (ROM), erasable programmable read-only memory (EPROM or flash memory), optical fibers, convenient compact disk read-only memory (CD-ROM), optical storage devices, magnetic storage devices, or suitable combination thereof.

According to one or more embodiments of the present disclosure. Example 1 provides a method for displaying a video in an interface, including:

receiving a triggering operation for viewing a video detection interface; and in response to the triggering operation, displaying the video detection interface, wherein a video playback area and a playback progress bar of a video are displayed in the video detection interface, and at least one progress identification is presented on the playback progress bar, the progress identification is used for indicating video detection information corresponding to a playback progress.

According to one or more embodiments of the present disclosure, Example 2 is provided according to the method described in Example 1, where the video detection information indicated by the progress identification is further shown in the video detection interface, and the method further includes:

in response to a presenting operation for a target video segment corresponding to target video detection information, presenting the target video segment in the video playback area, displaying a target progress identification for indicating the target video detection information as being in a first display state, and displaying other progress identifications other than the target progress identification as being in a second display state.

According to one or more embodiments of the present disclosure, Example 3 is provided according to the method described in Example 2, where the video detection information indicated by the progress identification is further shown in the video detection interface, and the method further includes:

in response to a presenting operation for a target video segment corresponding to target video detection information, displaying the target video detection information as in a selected state.

According to one or more embodiments of the present disclosure, Example 4 is provided according to the method described in Example 2 or 3, where a trend graph of the video is further shown in the video detection interface, and the presenting operation includes at least one of the following triggering operations:

a first triggering operation for any video detection information displayed in the video detection interface:

a second triggering operation for moving a progress point in the playback progress bar into a progress interval corresponding to the target video segment; and a third triggering operation for moving a target icon in the trend graph into a time segment corresponding to the target video segment, wherein the trend graph includes at least one of a playback information trend graph and an interactive information trend graph.

According to one or more embodiments of the present disclosure, Example 5 is provided according to the method described in Example 4, where the presenting operation includes the second triggering operation for moving the progress point in the playback progress bar into the progress interval corresponding to the target video segment; and the second triggering operation comprises a triggering operation for a target progress identification for indicating the target video detection information.

According to one or more embodiments of the present disclosure, Example 6 is provided according to the method described in Example 4, and the method further includes:

in response to the presenting operation for the target video segment corresponding to the target video detection information, adjusting the target icon in the trend graph to a position matching a time point corresponding to the presenting operation, and displaying the time segment in the trend graph corresponding to the target video segment in a preset display state.

According to one or more embodiments of the present disclosure, Example 7 is provided according to the method described in Example 4, and the method further includes:

in response to a triggering operation for playing the video, playing the video, and adjusting a position of the progress point in the playback progress bar and a position of the target icon in the trend graph according to playback progress of the video;

when the video is played to a video segment corresponding to any video detection information, performing at least one of the following steps:

displaying a progress identification indicating the video detection information as the first display state;

displaying the video detection information as in a selected state.

According to one or more embodiments of the present disclosure, Example 8 is provided according to the method described in Example 1, where the video detection information indicated by the progress identification is further shown in the video detection interface, and displaying the video detection interface includes at least one of the following steps:

displaying one progress identification in the at least one progress identification as being in a first display state, and displaying other progress identifications other than the one progress identification as being in a second display state; and displaying the video detection information indicated by the progress identification in the at least one progress identification as in a selected state.

According to one or more embodiments of the present disclosure, Example 9 is provided according to the method described in any one of Examples 1-3, where at least one piece of playback channel information of the video is further shown in the video detection interface, and the method further includes:

in response to a triggering operation for target playback channel information in the at least one piece of playback channel information, presenting a page thumbnail corresponding to the target playback channel information, wherein video information of the video is shown in the page thumbnail.

According to one or more embodiments of the present disclosure, Example 10 is provided according to the method described in any one of Examples 1-3, where at least one piece of associated object source information is further shown in the video detection interface, and the method further includes:

in response to a triggering operation of target associated object source information in the at least one piece of associated object source information, presenting target content published by a publisher of the video, wherein the target content is multimedia content of a type that matches the target associated object source information.

According to one or more embodiments of the present disclosure, Example 11 is provided according to the method described in any one of Examples 1-3, where a publisher creation suggestion is further shown in the video detection interface, and the method further includes:

in response to a triggering operation for a guiding control for the publisher creation suggestion, presenting guiding content corresponding to the publisher creation suggestion to guide a publisher of the video to create based on the publisher creation suggestion.

According to one or more embodiments of the present disclosure, Example 12 is provided according to the method described in any one of Examples 1-3, where the method further includes in response to a triggering operation for any progress identification in the at least one progress identification, presenting the video detection information indicated by the progress identification in the video detection interface.

According to one or more embodiments of the present disclosure, Example 13 provides an apparatus for displaying a video in an interface, including:

an operation receiving module configured to receive a triggering operation for viewing a video detection interface; and a interface display module configured to display the video detection interface in response to the triggering operation, wherein a video playback area and a playback progress bar of a video are displayed in the video detection interface, at least one progress identification is presented on the playback progress bar, and the progress identification is used for indicating video detection information corresponding to a playback progress.

According to one or more embodiments of the present disclosure, Example 14 provides an electronic device comprising:

a processor;

a memory configured to store a program;

when the program is executed by the processor, the processor implements the method for displaying a video in an interface as described in any one of Examples 1-12.

According to one or more embodiments of the present disclosure, Example 15 provides a computer-readable storage medium having a computer program stored thereon, wherein, the computer program, when executed by a processor, implements the method for displaying a video in an interface as described in any one of Examples 1-12.

We claim:

1. A method for displaying a video, comprising:

receiving a triggering operation performed on a data analysis control corresponding to the video;

in response to the triggering operation, displaying a video detection interface configured to present information that is generated based on analyzing playback quantities and interactive data associated with the video, wherein a video playback area and a playback progress bar of the video are displayed in the video detection interface;

presenting at least one progress identification on the playback progress bar, wherein the at least one progress identification has a first display state and a second display state; and displaying the at least one progress identification in the first display state on the playback progress bar while information corresponding to a segment of the video is displayed in a selected state on the video detection interface.

2. The method of claim 1, wherein the at least one progress identification comprises a plurality of progress identifications, and the method further comprises:

in response to a presenting operation for a target video segment corresponding to target information, presenting the target video segment in the video playback area, displaying a target progress identification associated with the target information in a first display state, and displaying other progress identifications other than the target progress identification in a second display state.

3. The method of claim 1, wherein the method further comprises:

in response to a presenting operation for a target video segment corresponding to target information, displaying the target information in a selected state.

4. The method of claim 2, wherein a trend graph of the video is further presented in the video detection interface, and the presenting operation comprises at least one of the following triggering operations:

a first triggering operation for any one of pieces of information displayed in the video detection interface;

a second triggering operation for moving a progress point in the playback progress bar into a progress interval corresponding to the target video segment; and a third triggering operation for moving a target icon in the trend graph into a time segment corresponding to the target video segment, wherein the trend graph includes at least one of a playback information trend graph and an interactive information trend graph.

5. The method of claim 4, wherein the presenting operation comprises the second triggering operation for moving the progress point in the playback progress bar into the progress interval corresponding to the target video segment; and the second triggering operation comprises a triggering operation for a target progress identification associated with the target information.

6. The method of claim 4, further comprising:

in response to the presenting operation for the target video segment corresponding to the target information, adjusting the target icon in the trend graph to a position matching a time point corresponding to the presenting operation, and displaying the time segment in the trend graph corresponding to the target video segment in a preset display state.

7. The method of claim 4, further comprising:

in response to a triggering operation for playing the video, playing the video, and adjusting a position of the progress point in the playback progress bar and a position of the target icon in the trend graph according to playback progress of the video;

in the case that the video is played to a video segment corresponding to any one of pieces of information, performing at least one of the following steps:

displaying a progress identification indicating the piece of information as being in the first display state; or displaying the as being in a selected state.

8. The method of claim 1, wherein the at least one progress identification comprises a plurality of progress identifications, and the displaying the video detection interface comprises at least one of:

displaying one progress identification in the plurality of progress identifications as being in a first display state, and displaying other progress identifications other than the one progress identification as being in a second display state; and displaying information associated with the progress identification in the plurality of progress identifications as being in a selected state.

9. The method of claim 1, wherein at least one piece of playback channel information of the video is further presented in the video detection interface, and the method further comprises:

in response to a triggering operation for target playback channel information in the at least one piece of playback channel information, presenting a page thumbnail corresponding to the target playback channel information, wherein video information of the video is presented in the page thumbnail.

10. The method of claim 1, wherein at least one piece of associated object source information is further presented in the video detection interface, and the method further comprises:

in response to a triggering operation for target associated object source information in the at least one piece of associated object source information, presenting target content published by a publisher of the video, wherein the target content is multimedia content of a type that matches the target associated object source information.

11. The method of claim 1, wherein a publisher creation suggestion is further presented in the video detection interface, and the method further comprises:

in response to a triggering operation for a guiding control for the publisher creation suggestion, presenting guiding content corresponding to the publisher creation suggestion to guide a publisher of the video to create based on the publisher creation suggestion.

12. The method of claim 1, wherein the at least one progress identification comprises a plurality of progress identifications, wherein the method further comprises:

in response to a triggering operation for any progress identification in the plurality of progress identifications, presenting information associated with the any progress identification in the video detection interface.

13. An electronic device, comprising:

a processor, a memory configured to store a program, wherein the program, when executed by the processor, causes the processor to implement operations comprising:

receiving a triggering operation performed on a data analysis control corresponding to a video;

in response to the triggering operation, displaying a video detection interface configured to present information that is generated based on analyzing playback quantities and interactive data associated with the video, wherein a video playback area and a playback progress bar of the video are displayed in the video detection interface;

presenting at least one progress identification on the playback progress bar, wherein the at least one progress identification has a first display state and a second display state; and displaying the at least one progress identification in the first display state on the playback progress bar while information corresponding to a segment of the video is displayed in a selected state on the video detection interface.

14. The electronic device of claim 13, wherein the at least one progress identification comprises a plurality of progress identifications, and the operations further comprise:

in response to a presenting operation for a target video segment corresponding to target information, presenting the target video segment in the video playback area, displaying a target progress identification associated with the target information in a first display state, and displaying other progress identifications other than the target progress identification in a second display state.

15. A non-transitory computer-readable storage medium having a computer program stored thereon, the computer program, when executed by a processor, causes the processor to implement operations comprising:

receiving a triggering operation performed on a data analysis control corresponding to a video;

in response to the triggering operation, displaying a video detection interface configured to present information that is generated based on analyzing playback quantities and interactive data associated with the video, wherein a video playback area and a playback progress bar of the video are displayed in the video detection interface;

presenting at least one progress identification on the playback progress bar, wherein the at least one progress identification has a first display state and a second display state; and displaying the at least one progress identification in the first display state on the playback progress bar while information corresponding to a segment of the video is displayed in a selected state on the video detection interface.

16. The electronic device of claim 13, wherein the operations further comprise:

in response to a presenting operation for a target video segment corresponding to target information, displaying the target information in a selected state.

17. The electronic device of claim 14, wherein a trend graph of the video is further presented in the video detection interface, and the presenting operation comprises at least one of the following triggering operations:

a first triggering operation for any one of pieces of information displayed in the video detection interface;

a second triggering operation for moving a progress point in the playback progress bar into a progress interval corresponding to the target video segment; and a third triggering operation for moving a target icon in the trend graph into a time segment corresponding to the target video segment, wherein the trend graph includes at least one of a playback information trend graph and an interactive information trend graph.

18. The electronic device of claim 17, wherein the presenting operation comprises the second triggering operation for moving the progress point in the playback progress bar into the progress interval corresponding to the target video segment; and the second triggering operation comprises a triggering operation for a target progress identification associated with the target.

19. The electronic device of claim 17, wherein the operations further comprise:

in response to the presenting operation for the target video segment corresponding to the target information, adjusting the target icon in the trend graph to a position matching a time point corresponding to the presenting operation, and displaying the time segment in the trend graph corresponding to the target video segment in a preset display state.

20. The electronic device of claim 17, wherein the operations further comprise:

in response to a triggering operation for playing the video, playing the video, and adjusting a position of the progress point in the playback progress bar and a position of the target icon in the trend graph according to playback progress of the video;

in the case that the video is played to a video segment corresponding to any one of pieces of information, performing at least one of the following operations: displaying a progress identification indicating the piece of information as being in the first display state; or displaying the information as being in a selected state.

\* \* \* \* \*